United States Patent
Maekawa et al.

(10) Patent No.: US 6,872,324 B2
(45) Date of Patent: Mar. 29, 2005

(54) AQUEOUS DISPERSION

(75) Inventors: Takashige Maekawa, Kanagawa (JP); Minako Shimada, Kanagawa (JP); Ryuji Seki, Kanagawa (JP); Taiki Hoshino, Kanagawa (JP)

(73) Assignee: Asahi Glass Company, Limited, Tokyo (JP)

(*) Notice: Subject to any disclaimer, the term of this patent is extended or adjusted under 35 U.S.C. 154(b) by 93 days.

(21) Appl. No.: 10/354,034

(22) Filed: Jan. 30, 2003

(65) Prior Publication Data

US 2003/0176572 A1 Sep. 18, 2003

(30) Foreign Application Priority Data

Jan. 31, 2002 (JP) ........................ 2002-023343

(51) Int. Cl.⁷ .................... C14C 9/00; D06M 15/256; D06M 15/347; C08F 136/16; C08F 236/16
(52) U.S. Cl. .................... 252/8.57; 252/8.62; 523/169; 524/805; 526/243; 526/245; 526/246; 526/247; 526/248; 526/249; 526/250; 526/252
(58) Field of Search ................. 252/8.57, 8.62; 523/169; 524/805; 526/243, 245, 246, 247, 248, 249, 250, 252

(56) References Cited

U.S. PATENT DOCUMENTS

| | | | |
|---|---|---|---|
| 2,892,824 A | * 6/1959 | Bolstad et al. ............... 526/249 |
| 2,911,396 A | * 11/1959 | Bolstad et al. ............... 526/227 |
| 2,915,508 A | * 12/1959 | Bolstad et al. ............... 526/227 |
| 2,958,683 A | * 11/1960 | Hopkin et al. ............... 526/251 |
| 3,155,735 A | * 11/1964 | Barr ........................... 570/137 |
| 3,398,128 A | * 8/1968 | Bolstad et al. ............... 526/229 |
| 3,607,850 A | * 9/1971 | Smith ......................... 526/93 |
| 4,041,229 A | * 8/1977 | Pattison ...................... 526/249 |
| 4,859,754 A | 8/1989 | Maekawa et al. |
| 5,057,577 A | 10/1991 | Matsuo et al. |
| 5,214,115 A | * 5/1993 | Langstein et al. .......... 526/247 |
| 5,688,309 A | 11/1997 | Shimada et al. |
| 6,177,531 B1 | 1/2001 | Shimada et al. |
| 6,251,984 B1 | 6/2001 | Shimada et al. |
| 6,271,283 B1 | 8/2001 | Shimada et al. |
| 6,376,592 B1 | 4/2002 | Shimada et al. |
| 6,395,821 B1 | 5/2002 | Shimada et al. |
| 2003/0125490 A1 | * 7/2003 | Kashiwagi et al. ......... 526/252 |

FOREIGN PATENT DOCUMENTS

| | | |
|---|---|---|
| EP | 0 964 032 A1 | 12/1999 |
| EP | 1 174 484 A1 | 1/2002 |
| JP | 2000-247914 | 9/2000 |
| WO | WO 02/088272 | 11/2002 |

OTHER PUBLICATIONS

JPO machine translation of JP2000–247914–A (Sep. 12, 2000).*
Derwent Abstracts, AN 2002–759777. XP–002241024, WO 02/064696, Aug. 22, 2002.
Derwent Abstracts, AN 1997–316823, XP–002241025, JP 09–125051, May 13, 1997.

* cited by examiner

*Primary Examiner*—Matthew A. Thexton
(74) *Attorney, Agent, or Firm*—Oblon, Spivak, McClelland, Maier & Neustadt, P.C.

(57) ABSTRACT

An aqueous dispersion comprising a polymer (a) having a repeating unit (A) which comprises four carbon atoms connected in a linear chain and which has one double bond at the second position and a polyfluoroalkyl group bonded to an arbitrary carbon atom, and a surfactant (B) having a hydrophile-lipophile balance of at least 10, wherein the polymer (a) is dispersed in an aqueous medium by the surfactant (B).

22 Claims, No Drawings

AQUEOUS DISPERSION

The present invention relates to an aqueous dispersion which is capable of imparting water and oil repellency or antifouling properties to articles.

A polymer obtained from a fluorinated diene compound is disclosed in JP-A-2000-247914, and it is known that such a polymer is excellent in water and oil repellency. However, to react such a compound by solution polymerization, it is necessary to use a large amount of an organic solvent, and there has been a problem that the reactivity for polymerization is so low that it is poor in practical usefulness.

The present invention has been made to solve the above-mentioned problem. Namely, it is an object of the present invention to provide an aqueous dispersion which can be obtained by using a reaction excellent in the reactivity for polymerization, whereby the amount of an organic solvent to be used, is reduced.

The present invention provides an aqueous dispersion comprising a polymer (a) having a repeating unit (A) which comprises four carbon atoms connected in a linear chain and which has one double bond at the second position and a polyfluoroalkyl group (hereinafter referred to as a $R^f$ group) bonded to an arbitrary carbon atom, and a surfactant (B) having a hydrophile-lipophile balance (hereinafter referred to as a HLB value) of at least 10, wherein the polymer (a) is dispersed in an aqueous medium by the surfactant (B).

Further, the present invention provides a method for producing an aqueous dispersion, which comprises subjecting a 1,3-diene having a polyfluoroalkyl group to an emulsion polymerization reaction in an aqueous medium in the presence of a surfactant (B) having a HLB value of at least 10, to form an aqueous dispersion having a polymer (a) having the repeating unit (A) dispersed.

The aqueous dispersion of the present invention is excellent in the durability of the water and oil repellency against washing or abrasion, as compared with a conventional water and oil repellent composition containing an ester type or ether type $R^f$ group-containing compound. Further, it can be produced or used in a form where the amount of an organic solvent is small, whereby a load on the environment is little. Further, it is not required to take out the polymer as is required in the case of a conventional water and oil repellent composition, whereby there is a merit that the handling is simple.

The polymer (a) in the present invention has a repeating unit (A) which comprises four carbon atoms connected in a linear chain and which has one double bond at the second position and an $R^f$ group bonded to an arbitrary carbon atom.

The repeating unit (A) in the polymer (a) is preferably one formed from a compound of the following Formula 1 (hereinafter referred to as the compound A):

Formula 1 wherein $R^f$ is a $C_{1-20}$ polyfluoroalkyl group, and X is a monovalent organic group having at least two double bonds.

The $R^f$ group is a group having at least two hydrogen atoms of the corresponding alkyl group substituted by fluorine atoms. Further, some of the remaining hydrogen atoms may be substituted by halogen atoms such as chlorine atoms. $R^f$ is preferably a group having at least 60% in number of hydrogen atoms in the corresponding alkyl group substituted by fluorine atoms, more preferably a group having at least 80% thereof substituted by fluorine atoms, particularly preferably a group having 100% thereof substituted by fluorine atoms (i.e. a perfluoroalkyl group). Further, when the carbon number of the $R^f$ group is three or more, the $R^f$ group may be of a linear chain or a branched chain.

$R^f$ is preferably a $R^f$ group having from 1 to 12 carbon atoms, particularly preferably a group represented by $C_kF_{2k+1}$— (wherein k is an integer of from 1 to 12) or $C_jF_{2j+1}$—$(CY^1Y^2CY^3Y^4)_i$— (wherein each of $Y^1$, $Y^2$, $Y^3$ and $Y^4$ which are independent of one another, is a hydrogen atom, a fluorine atom or a chlorine atom, provided that at least one of them is a fluorine atom, and j and i are each an integer of at least 1 and satisfy $12 \geq (j+2\times i) \geq 1$).

Further, $R^f$ may have at least one carbon-carbon unsaturated double bond, or some of carbon atoms may be substituted by an etheric oxygen atom. For example, a perfluoro(oxaalkyl) group (particularly, a polyfluoro(oxaalkyl) group) having at least one perfluoroxypropylene group, may preferably be mentioned.

As $R^f$, the following groups may preferably be mentioned, but it is not limited thereto.

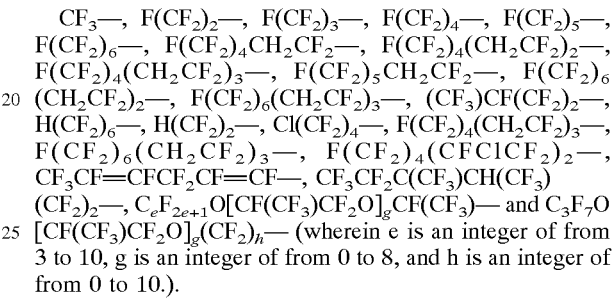

X in the Formula 1 is preferably a monovalent hydrocarbon group, and hydrogen atoms in the hydrocarbon group may be substituted by halogen atoms such as fluorine atoms or chlorine atoms. X is particularly preferably a group represented by —$CD^1$=$CD^2$CH=$CH_2$ (wherein each of $D^1$ and $D^2$ which are independent of each other, is a hydrogen atom or a halogen atom). Each of $D^1$ and $D^2$ is preferably a hydrogen atom or a fluorine atom. X is particularly preferably —CF=CHCH=$CH_2$, —CH=CFCH=$CH_2$ or —CH=CHCH=$CH_2$. It is preferred to use a compound A having such a group, since superior water and oil repellency and its durability can thereby be imparted to an article.

In the polymer (a), the proportion of the repeating unit (A) is preferably at least 10 mass %. The polymer (a) may have a polymerized unit derived from a monomer (b) containing no fluorine atom. If the monomer (b) is employed, the polymer (a) can be obtained in good yield, as compared with a case where polymerization is carried out by using the compound A alone. As the monomer (b), one or more types may be employed.

The monomer (b) may, for example, be preferably ethylene, vinylidene chloride, vinyl chloride, vinyl acetate, cetyl (meth)acrylate, stearyl (math)acrylate, behenyl (meth)acrylate, styrene, α-methylstyrene, p-methylstyrene, glycidyl (meth)acrylate, (meth)acrylamide, N,N-dimethyl (meth)acrylamide, diacetone (meth)acrylamide, methylol-modified diacetone (meth)acrylamide, N-methylol (meth)acrylamide, a vinyl alkyl ether, a chlorinated alkyl vinyl ether, a vinyl alkyl ketone, butadiene, isoprene, chloroprene, aziridinylethyl (meth)acrylate, benzyl (meth)acrylate, aziridinyl (meth)acrylate, a polyoxyalkylene (meth)acrylate, a methyl polyoxyalkylene (meth)acrylate, a 2-ethylhexylpolyoxyalkylene (meth)acrylate, a polyoxyalkylene di(meth)acrylate, a (meth)acrylate having a polysiloxane, triallyl cyanurate, allyl glycidyl ether, allyl acetate, N-vinyl carbazole, maleimide, N-methylmaleimide, (2-dimethylamino)ethyl (meth)acrylate, a (meth)acrylate having a $C_{8-20}$ alkyl group, a cycloalkyl (meth)acrylate, hydroxyethyl (meth)acrylate, glycerol (meth)acrylate, a (meth)acrylate having a silicone in its side chain, a (meth)

acrylate having a urethane bond, an alkylene di(meth)acrylate, or a polyoxyalkylene di(meth)acrylate.

Particularly preferred as the monomer (b) is a (meth)acrylate containing a saturated hydrocarbon group having at least 14 carbon atoms. Further, vinyl chloride, a hydroxyethyl (meth)acrylate containing a reactive group such as a hydroxyl group in its molecule, a polyoxyalkylene (meth)acrylate, a methylpolyoxyalkylene (meth)acrylate, glycidyl (meth)acrylate, bifunctional polyoxyethylene di(meth)acrylate, ethylene glycol dimethacrylate or blocked isocyanate ethyl (meth)acrylate, is preferred to improve the adhesion of the polymer (a) to a substrate.

The proportion of the polymerized unit derived from the monomer (b) in the polymer (a) is preferably within a range of compound A/monomer (b)=10/90 to 95/5, particularly preferably within a range of 15/85 to 85/15, by a mass ratio of the monomers.

The polymer (a) preferably further has a polymerized unit derived from a monomer (d) of the following Formula 3. As the monomer (d), one or more types may preferably be used.

$$(Z-Y)_n-G \quad \text{Formula 3}$$

wherein, n is 1 or 2, Z is a $R^f$ group, Y is a bivalent connecting group, G is a monovalent or bivalent polymerizable group.

Y is preferably an alkylene group, a polyoxyalkylene group, an imino group or a group having e.g. an ester bond, an amide bond, an urethane bond or an ether linkage. Particularly preferred as Y is a group represented by —$R^M$-Q-$R^N$— (each of $R^M$ and $R^N$ which are independent of each other, is a single bond, or a saturated or unsaturated $C_{1-22}$ hydrocarbon group which may contain at least one hydrogen atom, and Q is a single bond, —OCONH—, —CONH—, —SO$_2$NH— or —NHCONH—).

Specifically, Y may, for example, be —CH$_2$—, —CH$_2$CH$_2$—, —(CH$_2$)$_{11}$—, —CH$_2$CH$_2$CH$_2$(CH$_3$)—, —CH=CHCH$_2$—, —(CH$_2$CHR'O)$_v$—CH$_2$CH$_2$— (wherein v is an integer of from 1 to 10, and R' is a hydrogen atom or a methyl group), —C$_2$H$_4$—OCONH—C$_2$H$_4$—, —C$_2$H$_4$—OCO—C$_2$H$_4$— or —COOC$_2$H$_4$—.

G in the Formula 3 is preferably an ethylenic polymerizable unsaturated group, such as a residual group of an olefin (—CR$^1$=CH$_2$), a residual group of a vinyl ether (—OCR$^1$=CH$_2$), a residual group or a vinyl ester (—COOCR$^1$=CH$_2$), a residual group of a (meth)acrylate (—OCOCR$^1$=CH$_2$), or a residual group of a maleic acid ester or a fumaric acid ester (—OCOCH=CHCOO—). Here, R$^1$ is a hydrogen atom, a fluorine atom, a chlorine atom or a $C_{1-3}$ alkyl group.

G is preferably a residual group of a (meth)acrylate or a residual group of a maleic acid ester or a fumaric acid ester, in view of the excellent polymerizability, and particularly preferred is a residual group of a (meth)acrylate, since the solubility in the solvent is good, and the emulsion polymerization is easy.

As the monomer (d), a known $R^f$ group-containing monomer may be used. The following compounds may preferably be mentioned as specific examples of the monomer (d), wherein R is a hydrogen atom or a methyl group.

F(CF$_2$)$_3$CH$_2$OCOCR=CH$_2$,

F(CF$_2$)$_4$CH$_2$OCOCR=CH$_2$,

F(CF$_2$)$_5$CH$_2$OCOCR=CH$_2$,

F(CF$_2$)$_6$CH$_2$CH$_2$OCOCR=CH$_2$,

H(CF$_2$)$_6$CH$_2$CH$_2$OCOCR=CH$_2$,

F(CF$_2$)$_8$CH$_2$CH$_2$OCOCR=CH$_2$, (CF$_3$)$_2$CF(CF$_2$)$_5$CH$_2$CH$_2$OCOCR=CH$_2$,

F(CF$_2$)$_8$SO$_2$N(C$_3$H$_7$)CH$_2$CH$_2$OCOCR=CH$_2$,

F(CF$_2$)$_8$CH$_2$CH$_2$CH$_2$OCOCR=CH$_2$,

F(CF$_2$)$_8$(CH$_2$)$_4$OCOCR=CH$_2$,

F(CF$_2$)$_8$H$_2$CH$_2$CH(CH$_3$)OCOCR=CH$_2$,

F(CF$_2$)$_8$SO$_2$N(CH$_3$)CH$_2$CH$_2$OCOCR=CH$_2$,

F(CF$_2$)$_8$SO$_2$N(C$_2$H$_5$)CH$_2$CH$_2$OCOCR=CH$_2$,

F(CF$_2$)$_8$CONHCH$_2$CH$_2$OCOCR=CH$_2$,

F(CF$_2$)$_8$CH$_2$CF$_2$(CH$_2$)$_2$OCOCH=CH$_2$,

F(CF$_2$)$_8$CONH(CH$_2$)$_3$CH=CH$_2$, (CF$_3$)$_2$CF(CF$_2$)$_5$(CH$_2$)$_3$OCOCR=CH$_2$,

F(CF$_2$)$_9$CH$_2$CH$_2$OCOCR=CH$_2$,

F(CF$_2$)$_9$CONHCH$_2$CH$_2$OCOCR=CH$_2$,

F(CF$_2$)$_{10}$CH$_2$COOCR=CH$_2$,

F(CF$_2$)$_{10}$(CH$_2$)$_2$OCOCR=CH$_2$,

F(CF$_2$)$_{10}$(CH$_2$)$_3$OCOCR=CH$_2$,

F(CF$_2$)$_{10}$(CH$_2$)$_{11}$OCOCR=CH$_2$,

F(CF$_2$)$_{10}$CONH(CH$_2$)$_2$CR=CH$_2$,

F(CF$_2$)$_{10}$CONH(CH$_2$)$_5$OCOCR=CH$_2$,

F(CF$_2$)$_{10}$(CF$_2$)$_2$(CH$_2$)$_2$OCOCR=CH$_2$,

Cl(CF$_2$)$_{10}$(CH$_2$)$_3$OCOCR=CH$_2$,

F(CF$_2$)$_{14}$SO$_2$NH(CH$_2$)$_2$CR=CH$_2$,

F(CF$_2$)$_{14}$(CH$_2$)$_6$OCOCR=CH$_2$,

CF$_3$CH$_2$CF$_2$C$_2$H$_4$OCOCR=CH$_2$,

CF$_3$(CH$_2$CF$_2$)$_2$C$_2$H$_4$OCOCR=CH$_2$,

CF$_3$(CH$_2$CF$_2$)$_3$C$_2$H$_4$OCOCR=CH$_2$,

F(CF$_2$)$_4$CH$_2$CF$_2$C$_2$H$_4$OCOCR=CH$_2$,

F(CF$_2$)$_4$(CH$_2$CF$_2$)$_2$C$_2$H$_4$OCOCR=CH$_2$,

F(CF$_2$)$_4$(CH$_2$CF$_2$)$_3$C$_2$H$_4$OCOCR=CH$_2$,

F(CF$_2$)$_6$CH$_2$CF$_2$C$_2$H$_4$OCOCR=CH$_2$,

F(CF$_2$)$_6$(CH$_2$CF$_2$)$_2$C$_2$H$_4$OCOCR=CH$_2$,

F(CF$_2$)$_6$(CH$_2$CF$_2$)$_3$C$_2$H$_4$OCOCR=CH$_2$,

F(CF$_2$)$_8$CH$_2$CF$_2$C$_2$H$_4$OCOCR=CH$_2$,

F(CF$_2$)$_8$(CH$_2$CF$_2$)$_2$C$_2$H$_4$OCOCR=CH$_2$,

F(CF$_2$)$_8$(CH$_2$CF$_2$)$_3$C$_2$H$_4$OCOCR=CH$_2$,

F(CF$_2$)$_{10}$CH$_2$CF$_2$C$_2$H$_4$OCOCR=CH$_2$,

F(CF$_2$)$_{10}$(CH$_2$CF$_2$)$_2$C$_2$H$_4$OCOCR=CH$_2$,

F(CF$_2$)$_{10}$(CH$_2$CF$_2$)$_3$C$_2$H$_4$OCOCR=CH$_2$,

C$_3$F$_7$OCF(CF$_3$)CONHC$_2$H$_4$OCOCR=CH$_2$, $C_6F_{13}OCF(CF_3)CH_2OCOCR=CH_2$, $C_3F_7O[CF(CF_3)CF_2O]_2CF(CF_3)CH_2OCOCR=CH_2$, $C_3F_7O[CF(CF_3)CF_2O]_3CF(CF_3)CH_2OCOCR=CH_2$, $C_3F_7O[CF(CF_3)CF_2O]_4CF(CF_3)CH_2OCOCR=CH_2$, $C_3F_7O[CF(CF_3)CF_2O]_5CF(CF_3)CH_2OCOCR=CH_2$, $F(CF_2)_4C_2H_4OCOC_2H_4COOC_2H_4(CF_2)_4F$, $F(CF_2)_4C_2H_4OCOC_4H_8COOC_2H_4(CF_2)_4F$, $F(CF_2)_4C_2H_4OCOC_2H_4COOC_2H_4(CF_2)_6F$, $F(CF_2)_4C_2H_4OCOC_2H_4COOC_2H_4(CF_2)_8F$, $F(CF_2)_8C_2H_4OCOC_2H_4COOC_2H_4(CF_2)_8F$, $F(CF_2)_8C_2H_4OCOCH=CHCOOC_2H_4(CF_2)_8F$, $F(CF_2)_6C_2H_4OCOC_2H_4COOC_2H_4(CF_2)_6F$, $F(CF_2)_4C_2H_4OCOCH=CHCOOC_2H_4(CF_2)_4F$, $F(CF_2)_6(CH_2CH(OH)CH_2)OCOC_2H_4COO(CH_2CH(OH)CH_2)(CF_2)_6F$, $F(CF_2)_4SO_2N(C_2H_5)C_2H_4OCOC_2H_4COOC_2H_4N(C_2H_5)SO_2(CF_2)_4F$.

The proportion of the polymerized unit derived from the monomer (d) in the polymer (a) is preferably at most 40 mass % (inclusive of 0 mass %), particularly preferably at most 25 mass %.

A double bond in the polymer (a) can be confirmed by means of e.g. $^{13}$C-NMR or $^{19}$F-NMR. Further, the average particle size of the polymer (a) can be measured by means of an electron microscope or a dynamic light scattering apparatus. The average particle size of the polymer (a) is preferably at most 10 $\mu$m, particularly preferably at most 7 $\mu$m.

The polymer (a) in the present invention may be a uniform copolymer or may have a sea-island structure wherein a copolymer having the repeating unit (A) is microscopically dispersed in a copolymer of another composition, or it may have a core/shell structure wherein they are present as unevenly distributed.

The aqueous dispersion of the present invention contains the surfactant (B) having a HLB value of at least 10. The surfactant (B) is preferably at least one selected from a nonionic surfactant, an anionic surfactant, a cationic surfactant or an amphoteric surfactant. It is particularly preferred to employ a nonionic surfactant and/or an anionic surfactant, and for applications to fiber products, a nonionic surfactant and/or a cationic surfactant is preferred.

The proportion of the surfactant (B) is preferably from 0.5 to 20 parts by mass, particularly preferably from 1 to 10 parts by mass, per 100 parts by mass of the polymer (a). When the surfactant (B) is incorporated in a proper amount, the water and oil repellency, and the dispersion stability will be excellent.

The following surfactants are preferred as the surfactant (B).

As a nonionic surfactant, an alkylphenylpolyoxyethylene, an alkylpolyoxyethylene, an alkylpolyoxyalkylenepolyoxyethylene, a fatty acid ester, an alkylamineoxyethylene adduct, an alkylamideoxyethylene adduct, an alkylamineoxyethyleneoxypropylene adduct or an alkylamineoxide, may, for example, be preferably mentioned.

As a cationic surfactant, an amine salt, a quaternary ammonium salt or an oxyethylene addition type ammonium hydrochloride may, for example, be mentioned. Specifically, a trimethylalkylammonium hydrochloride, a dimethyldialkylammonium hydrochloride, a monoalkylamine acetate, or an alkylmethyldipolyoxyethyleneammonium hydrochloride may, for example, be preferably mentioned.

In the above surfactant, the alkyl group is preferably a $C_{4-26}$ saturated aliphatic group or unsaturated aliphatic group. Specifically, an octyl group, a dodecyl group, a tetradecyl group, a hexadecyl group, an octadecyl group, a behenyl group, an oleyl group or a stearyl group may, for example, be mentioned.

The anionic surfactant may, for example, be preferably a fatty acid salt, an $\alpha$-olefin sulfonic acid salt, an alkylbenzenesulfonic acid and its salt, an alkyl sulfuric acid ester salt, an alkylether sulfuric acid ester salt, an alkylphenylether sulfuric acid ester salt, a methyltauric acid salt or an alkylsulfosuccinic acid salt.

The amphoteric surfactant may, for example, be an alanine, an imidazolinium betaine, an amide betaine or an acetic acid betaine. Specifically, lauryl betaine, stearyl betaine, laurylcarboxymethylhydroxyethylimidazolinium betaine, lauryldimethylamino acetic acid betaine or a fatty acid amidepropyldimethylaminoacetic acid betaine may, for example, be preferably mentioned.

In the process for producing an aqueous dispersion of the present invention, the aqueous medium is preferably a medium containing water, and an organic solvent may be incorporated to the aqueous medium, as the case requires. The organic solvent is preferably a water-soluble organic solvent, and an organic solvent of ester type, ketone type or ether type, is preferred. The ratio of the organic solvent to water is not particularly limited.

The organic solvent may, for example, be preferably acetone, ethylene glycol monoethyl ether acetate, ethylene glycol monoethyl ether, ethylene glycol monomethyl ether, ethylene glycol monobutyl ether, propylene glycol monomethyl ether, propylene glycol monomethyl ether acetate, dipropylene glycol monomethyl ether, tripropylene glycol monomethyl ether, propylene glycol butyl ether, ethyl-3-ethoxy propionate, 3-methoxy-3-methyl-1-butanol, 2-tert-butoxy ethanol, isopropyl alcohol, n-butyl alcohol, isobutyl alcohol, ethyl alcohol, ethylene glycol, propylene glycol, dipropylene glycol or tripropylene glycol.

Further, in the process of the present invention, it is preferred to employ a polymerization initiator. As such a polymerization initiator, a water soluble or oil-soluble polymerization initiator is preferred, and a commonly used polymerization initiator of an azo type, peroxide type or redox type, may be used depending upon the polymerization temperature. The polymerization initiator is preferably a water soluble polymerization initiator, particularly preferably a salt of an azo type compound.

Further, in the method of the present invention, a chain transfer agent may be incorporated for the purpose of controlling the molecular weight. As such a chain transfer agent, an aromatic compound or a mercaptan is preferred, and particularly preferred is an alkyl mercaptan. Specifically, n-octyl mercaptan, n-dodecyl mercaptan, tert-dodecyl mercaptan, stearyl mercaptan or $\alpha$-methylstyrene dimer, may, for example, be preferably mentioned. The temperature for the emulsion polymerization reaction is not particularly limited, but a temperature of from 20 to 150° C. is preferred.

The aqueous dispersion of the present invention may contain various additives, such as a penetrant, a defoaming agent, a water-absorbing agent, an antistatic agent, an anti-crease agent, a texture-adjusting agent, a film-forming assistant, and a thermosetting agent such as a melamine resin or an urethane resin.

The article to be treated with the aqueous dispersion of the present invention, is not particularly limited. However, a fiber product of natural fiber, synthetic fiber or mixed fiber, a metal, glass, a resin, paper or leather, may, for example, be preferably mentioned.

The aqueous dispersion of the present invention may be applied to an article by means of an arbitrary method depending upon the type of the article or the formulation of the composition. For example, a method may be employed wherein it is deposited on the surface of an article by a coating method such as a dip coating, followed by drying.

The aqueous dispersion of the present invention may be used also in an application as a coating agent for work clothes, uniforms or filter materials to be used in an organic solvent or in the presence of a vapor of an organic solvent, as a surface protecting agent, as a coating agent for electronic devices or as an antifouling coating agent.

Now, the present invention will be described in further detail with reference to Examples (Examples 1 to 19) and Comparative Examples (Examples 20 to 25). However, it should be understood that the present invention is by no means restricted to such specific Examples. The evaluation with respect to Examples 1 to 25 was carried out by the following methods, and the results are shown in Table 6.

Water Repellency

Evaluation was carried out in accordance with the spray method of JIS L-1092, and the water repellency was represented by water repellency No. as identified in Table 1.

Oil Repellency

Evaluation was carried out in accordance with AATCC-TM118-1966, and the oil repellency was represented by oil repellency No. as identified in Table 2.

The evaluation result shown by adding symbol + or − to water repellency No. or oil repellency No., means that the particular evaluation is slightly better or worse than that represented by the respective No.

TABLE 1

| Water repellency No. | State |
| --- | --- |
| 100 | No deposition or wetting is observed on the surface |
| 90 | Slight deposition or wetting is observed on the surface |
| 80 | Partial wetting is observed on the surface |
| 70 | Substantial wetting is observed on the surface |
| 50 | Wetting is observed over the entire surface |
| 0 | Complete wetting is observed on both the front and rear sides |

TABLE 2

| Oil repellency No. | Test solution | Surface tension mN/m (25° C.) |
| --- | --- | --- |
| 8 | n-heptane | 20.0 |
| 7 | n-octane | 21.8 |
| 6 | n-decane | 23.5 |
| 5 | n-dodecane | 25.0 |
| 4 | n-tetradecane | 26.7 |
| 3 | n-hexadecane 65 parts of | 27.3 |

TABLE 2-continued

| Oil repellency No. | Test solution | Surface tension mN/m (25° C.) |
| --- | --- | --- |
| 2 | nujol/35 parts of hexadecane | 29.6 |
| 1 | Nujol | 31.2 |
| 0 | Less than 1 | — |

EXAMPLE 1

Into a 100 ml glass ample for polymerization, 8.00 g of $C_7F_{15}CF=CHCH=CH_2$ (hereinafter referred to as C7 diene), 12.2 g of stearyl acrylate (hereinafter referred to as STA), 0.42 g of hydroxyethyl acrylate (hereinafter referred to as HEA), 0.3 g of a polyoxyalkylene glycol monomethacrylate, 1.68 g of polyoxyethylene octylphenyl ether (hereinafter referred to as emulsifier A), 0.42 g of stearyl triethyl ammonium chloride (hereinafter referred to as emulsifier B), 26.20 g of water, 10.5 g of acetone, 0.11 g of stearyl mercaptan (hereinafter referred to as StSH) as a molecular weight controlling agent and 0.04 g of 2,2'-azobis (2-methylpropioneamidine) dihydrochloride (hereinafter referred to as initiator A) as an initiator, were charged. After flushing the interior of the ample with nitrogen, a polymerization reaction was carried out at 55° C. for 15 hours, to obtain an emulsion Z having a solid content concentration of 39.17 mass %.

EXAMPLE 2

In the same manner as in Example 1 except that the amount of C7 diene was changed to 11.6 g, and the amount of STA was changed to 8.6 g, an emulsion having a solid content concentration of 38.87% was obtained.

EXAMPLES 3 TO 14

In the same manner as in Example 1 except that the compounds shown in Table 4 or 5 were used in the composition as identified in the same Table, an emulsion (the solid content concentration is shown in the respective Table) was obtained. The numerals of the respective compounds in Table 4 or 5 represent the mass (unit: g), and the solid content concentration represents the mass %.

Further, the polymerization temperature and the polymerization time were 55° C. and 15 hours in Examples 3 to 9 and 11 to 13, and 60° C. and 12 hours in Examples 10 and 14.

Further, the meanings of the abbreviations in Table 4 or 5 are as shown in Table 3.

TABLE 3

| Abbreviation | Chemical formula or name of compound |
| --- | --- |
| C3 diene | $C_3F_7CH=CFCH=CH_2$ |
| C5 diene | $C_5F_{11}CF=CHCH=CH_2$ |
| C3FMA | $C_3F_6C_2H_4C(CH_3)=CH_2$ |
| C4FA | $C_4F_6C_2H_4OCOCH=CH_2$ |
| C4FMA | $C_4F_6C_2H_4OCOC(CH_3)=CH_2$ |
| C6FA | $C_6F_{13}C_2H_4OCOCH=CH_2$ |
| CqFA | $C_qF_{2q+1}C_2H_4OCOCH=CH_2$ (q = average 9) |
| C10FA | $C_{10}F_{21}C_2H_4OCOCH=CH_2$ |
| HFPO2 | $C_3F_7OCF(CF_3)CH_2OCOCH=CH_2$ |
| HFPO3 | $C_3F_7OCF(CF_3)CF_2OCF(CF_3)CH_2OCOCH=CH_2$ |
| HFPO7 | $C_3F_7O[CF(CF_3)CF_2O]_5CF(CF_3)CH_2OCOCH=CH_2$ |

TABLE 3-continued

| Abbreviation | Chemical formula or name of compound |
|---|---|
| POMMA | Polyethylene glycol monomethacrylate |
| 2EHA | 2-Ethylhexyl acrylate |
| Emulsifier B | Stearyltriethylammonium chloride |

TABLE 4

| | Ex. 1 | Ex. 2 | Ex. 3 | Ex. 4 | Ex. 5 | Ex. 6 | Ex. 7 |
|---|---|---|---|---|---|---|---|
| C7 diene | 8.0 | 11.6 | 12.5 | 12.5 | 4.3 | 12.5 | 8.36 |
| C3FMA | — | — | 4.7 | — | — | — | — |
| C4FA | — | — | — | 4.7 | — | — | — |
| C4FMA | — | — | — | — | — | 4.7 | — |
| C6FA | — | — | — | — | 4.3 | — | — |
| STA | 12.2 | 8.6 | 4.63 | 4.63 | 13.0 | 4.63 | 10.2 |
| HEA | 0.42 | 0.42 | 0.45 | 0.45 | 0.42 | 0.45 | 0.44 |
| POMMA | 0.3 | 0.3 | 0.34 | 0.34 | 0.3 | 0.34 | 0.33 |
| 2EHA | — | — | — | — | — | — | 2.54 |
| Emulsifier A | 1.68 | ← | ← | ← | ← | ← | ← |
| Emulsifier B | 0.42 | ← | ← | ← | ← | ← | ← |
| Water | 26.2 | ← | ← | ← | ← | ← | ← |
| Acetone | 10.5 | ← | ← | ← | ← | ← | ← |
| StSH | 0.11 | ← | ← | ← | ← | ← | ← |
| Initiator A | 0.04 | ← | ← | ← | ← | ← | ← |
| Solid content concentration | 39.2 | 38.9 | 37.4 | 36.5 | 36.7 | 37.2 | 39.0 |

TABLE 5

| | Ex. 8 | Ex. 9 | Ex. 10 | Ex. 11 | Ex. 12 | Ex. 13 | Ex. 14 |
|---|---|---|---|---|---|---|---|
| C3 diene | 8.0 | — | 10.4 | — | — | — | 10.4 |
| C5 diene | — | 8.0 | — | 10.4 | — | — | — |
| C7 diene | — | — | — | — | 10.4 | 10.4 | — |
| CmFA | — | — | — | 1.2 | — | — | — |
| C10FA | — | — | 1.2 | — | — | — | — |
| HFPO2 | — | — | — | — | — | — | 1.2 |
| HFPO3 | — | — | — | — | — | 1.2 | — |
| HFPO7 | — | — | — | — | 1.2 | — | — |
| STA | 12.2 | ← | 8.6 | ← | ← | ← | ← |
| HEA | 0.42 | ← | ← | ← | ← | ← | ← |
| PONMA | 0.3 | ← | ← | ← | ← | ← | ← |
| Emulsifier A | 1.68 | ← | ← | ← | ← | ← | ← |
| Emulsifier B | 0.42 | ← | ← | ← | ← | ← | ← |
| Water | 26.2 | ← | ← | ← | ← | ← | ← |
| Acetone | 10.5 | ← | ← | ← | ← | ← | ← |
| StSH | 0.11 | ← | ← | ← | ← | ← | ← |
| Initiator A | 0.04 | ← | ← | ← | ← | ← | ← |
| Solid content concentration | 38.2 | 38.8 | 38.4 | 38.7 | 38.7 | 38.1 | 38.7 |

EXAMPLE 15

Into a 100 ml glass ample, 59.7 g of emulsion Z, 3.62 g of C7 diene, 1.8 g of cyclohexyl methacrylate (hereinafter referred to as CHMA), 0.6 g of glycidyl methacrylate (hereinafter referred to as GMA), 2.6 g of dipropylene glycol and 0.06 g of initiator A were charged. After flushing the interior of the ample with nitrogen, a polymerization reaction was carried out at 60° C. for 12 hours to obtain an emulsion having a solid content concentration of 43.2 mass %.

EXAMPLE 16

Into a 100 ml glass ample for polymerization, 8.00 g of C4FA, 12.2 g of STA, 0.42 g of HEA, 0.3 g of POGMMA, 1.68 g of emulsifier A, 0.42 g of emulsifier B, 26.20 g of water, 10.5 g of acetone, 0.11 g of StSH and 0.04 g of initiator A were charged. After flushing the interior of the ample with nitrogen, a polymerization reaction was carried out at 55° C. for 12 hours to obtain an emulsion A having a solid content concentration of 38.9 mass %.

In the same manner as in Example 15 except that instead of 59.74 g of emulsion Z, 51.36 g of emulsion A was used, an emulsion having a solid content concentration of 43.9 mass % was obtained.

EXAMPLE 17

In the same manner as in Example 15 except that in Example 15, the amount of C7 diene was changed to 2.7 g, instead of CHMA, 1.35 g of STA was used, the amount of GMA was changed to 0.45 g, instead of DPG, 13.2 g of water and 4.5 g of acetone were used and instead of initiator A, 0.34 g of initiator B was used, an emulsion having a solid content concentration of 32.7 mass %, was obtained.

EXAMPLE 18

In the same manner as in Example 16 except that instead of emulsion Z, emulsion A was used, an emulsion having a solid content concentration of 32.6% was obtained.

EXAMPLE 19

Into a homomixer (TK homomixer MK2, manufactured by TOKUSHU KIKA KOGYO CO., LTD.), 33.4 g of C7 diene, 22.2 g of C4FA, 2 g of emulsifier C (ethyleneoxidepropyleneoxide polymerized product), 7.38 g of emulsifier D (polyoxyethylene oleyl ether), 0.8 g of emulsifier E (acetylene glycol ethyleneoxide 30 mol adduct), 0.8 g of emulsifier F (acetylene glycol ethyleneoxide 10 mol adduct), 296.42 g of water, 82 g of acetone and 2.2 g of StSH were charged, heated to 50° C. and then mixed to obtain an emulsion.

Then, while maintaining the obtained emulsion at 50° C., it was put into a high pressure emulsifier (LAB60-10TBS, manufactured by APV Goulin Company) and further emulsified under a condition of 40 MPa. The obtained emulsion was transferred to a 1 l glass reactor and cooled to 40° C., and then 2.2 g of initiator A was added, whereupon the interior of the reactor was flushed with nitrogen. And, 88 g of vinyl chloride was added, and with stirring, the temperature was raised to 55° C. to carry out a polymerization reaction for 12 hours, to obtain an emulsion having a solid content concentration of 27.4 mass %.

EXAMPLE 20

In the same manner as in Example 1 except that instead of C7 diene, C6FA was used, an emulsion having a solid content concentration of 38.3 mass %, was obtained.

EXAMPLE 21

In the same manner as in Example 1 except that instead of C7 diene, HFPO3 was used, an emulsion having a solid content concentration of 37.8 mass % was obtained.

EXAMPLE 22

In the same manner as in Example 1 except that instead of C7 diene, HFPO7 was used, an emulsion having a solid content concentration of 37.8 mass % was obtained.

EXAMPLE 23

In the same manner as in Example 1 except that instead of C7 diene and STA, 4.7 g of C4FA, 4.63 g of STA and 12.5 g of butadiene, were used, an emulsion having a solid content concentration of 37.2 mass % was obtained.

EXAMPLE 24

In the same manner as in Example 16 except that in stead of emulsion Z, 38.3 g of emulsion A was used, and instead of C7 diene, C4FA was used, an emulsion having a solid content concentration of 32.8 mass % was obtained.

EXAMPLE 25

In the same manner as in Example 15 except that instead of C7 diene, C4FA was used, an emulsion having a solid content concentration of 42 mass % was obtained.
Evaluation The emulsions obtained in Examples 1 to 25 were diluted with deionized water so that the solid content concentration would be 1 mass % and were used as single treatment test solutions. Further, to such test solutions, trimethylol melamine and an organic amine salt catalyst ("ACX", trade name, manufactured by Sumitomo Chemical Co., Ltd.) were added respectively in an amount of 0.3% and used as combination treatment test solutions.

A polyester cloth was dipped in and coated with each test solution and squeezed so that the wet pick up would be 90%, then dried at 110° C. for 180 seconds and subjected to heat treatment at 170° C. for 60 seconds to obtain a test cloth. Using the test cloth, the water repellency and the oil repellency before washing were evaluated. Further, the obtained test cloth was washed five times by an electric washing machine and then dried in air overnight at 25° C. and used as a test cloth after washing, whereby water repellency and the oil repellency after washing were evaluated.

TABLE 6

| | Single treatment | | | | Combination treatment | | | |
|---|---|---|---|---|---|---|---|---|
| | Before washing | | After washing | | Before washing | | After washing | |
| Ex. | Water repellency | Oil repellency | Water repellency | Oil repellency | Water repellency | Oil repellency | Water repellency | Oil repellency |
| 1 | 80+ | 5 | 70− | 4 | 100 | 5 | 90+ | 4+ |
| 2 | 80+ | 5− | 70− | 4 | 100 | 5 | 90 | 4+ |
| 3 | 80 | 4 | 70− | 4 | 90+ | 5− | 80+ | 4 |
| 4 | 80 | 4 | 70− | 4 | 90+ | 5− | 80+ | 4 |
| 5 | 80 | 4 | 70− | 4 | 90+ | 4+ | 80+ | 3+ |
| 6 | 80 | 4+ | 70− | 4 | 100 | 4+ | 90+ | 3 |
| 7 | 80+ | 5 | 70 | 4 | 100 | 5 | 90 | 4 |
| 8 | 80+ | 4 | 70 | 3 | 90+ | 4 | 90 | 3 |
| 9 | 80 | 4+ | 70 | 4 | 100 | 4+ | 90 | 4+ |
| 10 | 90 | 5+ | 70+ | 5 | 100 | 5+ | 90 | 4+ |
| 11 | 90 | 5 | 70+ | 5− | 100 | 5 | 90 | 4 |
| 12 | 80+ | 5+ | 70+ | 4− | 100 | 5+ | 90 | 4 |
| 13 | 80+ | 4+ | 70 | 3 | 100 | 5 | 90− | 3+ |
| 14 | 80+ | 4 | 70 | 3 | 100 | 4+ | 90 | 3 |
| 15 | 100 | 4 | 80+ | 3− | 100 | 4 | 90 | 3+ |
| 16 | 100 | 4− | 80+ | 3− | 100 | 4 | 90 | 3 |
| 17 | 100 | 4 | 80+ | 3− | 100 | 4 | 90 | 3+ |
| 18 | 100 | 4− | 80+ | 3− | 100 | 4 | 90 | 3+ |
| 19 | 90 | 4 | 80 | 3 | 100 | 5 | 80 | 4+ |
| 20 | 100 | 4− | 70 | 2− | 100 | 4 | 50 | 2− |
| 21 | 70 | 4− | 0 | 0 | 80 | 4− | 50− | 1 |
| 22 | 70 | 5 | 0 | 0 | 80 | 4− | 50− | 1 |
| 23 | 100 | 5 | 50 | 2− | 100 | 5 | 70− | 2+ |
| 24 | 70+ | 3 | 50− | 1 | 70+ | 3 | 50− | 1+ |
| 25 | 70+ | 3 | 0 | 0 | 70+ | 3 | 50− | 1 |

The aqueous dispersion of the present invention comprises a polymer (a) having a repeating unit (A) which comprises four carbon atoms connected in a linear chain and which has one double bond at the second position and a polyfluoroalkyl group bonded to an arbitrary carbon atom, and a surfactant (B) having a hydrophile-lipophile balance (HLB value) of at least 10, whereby it is possible to impart excellent water and oil repellency and antifouling properties to an article. Further, the present invention can provide an aqueous dispersion which is capable of imparting water and oil repellency and antifouling properties excellent in durability against washing, abrasion, etc. Further, the present invention can provide an aqueous dispersion, whereby the handling is simple, and the load on the environment is small.

The entire disclosure of Japanese Patent Application No. 2002-023343 filed on Jan. 31, 2002 including specification, claims and summary is incorporated herein by reference in its entirety.

What is claimed is:

1. An aqueous dispersion comprising a polymer (a) having a repeating unit (A) which comprises four carbon atoms connected in a linear chain and which has one double bond at the second position and a polyfluoroalkyl group bonded to an arbitrary carbon atom, and a surfactant (B) having a hydrophile-lipophile balance of at least 10, wherein surfactant (B) is a nonionic surfactant and/or a cationic surfactant, and wherein the polymer (a) is dispersed in an aqueous medium by the surfactant (B).

2. The aqueous dispersion according to claim 1, wherein in the polymer (a), the repeating unit (A) is at least 10 mass %.

3. The aqueous dispersion according to claim 1, wherein the polymer (a) has an average particle size of at most 10 $\mu$m.

4. The aqueous dispersion according to claim 1, wherein the polymer (a) has a repeating unit (A) formed from a compound of the following formula 1:

$$R^f\text{—X} \qquad \text{Formula 1}$$

wherein $R^f$ is a $C_{1\text{-}20}$ polyfluoroalkyl group which may have at least one carbon-carbon unsaturated double bond or which may have carbon atom(s) substituted by an etheric oxygen atom and X is a monovalent organic group having at least two double bonds.

5. The aqueous dispersion according to claim 4, wherein in the compound of the formula 1, $R^f$ is a group represented by $C_kF_{2k+1}$—, wherein k is an integer of from 1 to 12 or $C_jF_{2j+1}$—$(CY^1Y^2CY^3Y^4)_i$—, wherein each of $Y^1$, $Y^2$, $Y^3$  and $Y^4$ which are independent of one another, is a hydrogen atom, a fluorine atom or a chlorine atom, provided that at least one of them is a fluorine atom, and j and i are each an integer of at least 1 and satisfy $12 \geq (j+2 \times i) \geq 1$.

6. The aqueous dispersion according to claim 4, wherein in the compound of the formula 1, X is a group represented by —$CD^1$=$CD^2CH$=$CH_2$, wherein each of $D^1$ and $D^2$ which are independent of each other, is a hydrogen atom or a halogen atom.

7. The aqueous dispersion according to claim 4, wherein $R^f$ is $CF_3$—, $F(CF_2)_2$—, $F(CF_2)_3$—, $F(CF_2)_4$—, $F(CF_2)_5$—, $F(CF_2)_6$—, $F(CF_2)_4CH_2CF_2$—, $F(CF_2)_4(CH_2CF_2)_2$—, $F(CF_2)_4(CH_2CF_2)_3$—, $F(CF_2)_5CH_2CF_2$—, $F(CF_2)_6(CH_2CF_2)_2$—, $F(CF_2)_6(CH_2CF_2)_3$—, $(CF_3)CF(CF_2)_2$—, $H(CF_2)_6$—, $H(CF_2)_2$—, $Cl(CF_2)_4$—, $F(CF_2)_4(CH_2CF_2)_3$—, $F(CF_2)_6(CH_2CF_2)_3$—, $F(CF_2)_4(CFClCF_2)_2$—, $CF_3CF$=$CFCF_2CF$=$CF$—, $CF_3CF_2C(CF_3)CH(CF_3)(CF_2)_2$—, $C_eF_{2e+1}O[CF(CF_3)CF_2O]_gCF(CF_3)$— or $C_3F_7O[CF(CF_3)CF_2O]_g(CF_2)_h$, wherein e is an integer of from 3 to 10, g is an integer of from 0 to 8, and h is an integer of from 0 to 10.

8. The aqueous dispersion according to claim 4, wherein X is —CF=CHCH=CH$_2$, —CH=CFCH=CH$_2$ or —CH=CHCH=CH$_2$.

9. The aqueous dispersion according to claim 1, wherein the proportion of the surfactant (B) is from 0.5 to 20 parts by mass per 100 parts by mass of the polymer (a).

10. A method for producing an aqueous dispersion of claim 1, which comprises subjecting a 1,3-diene having a polyfluoroalkyl group to an emulsion polymerization reaction in an aqueous medium in the presence of a surfactant (B) having a hydrophile-lipophile balance of at least 10, to form an aqueous dispersion having a polymer (a) having the repeating unit (A) of claim 1 dispersed.

11. The method for producing an aqueous dispersion according to claim 10, wherein the surfactant (B) is a nonionic surfactant and/or a cationic surfactant.

12. The aqueous dispersion according to claim 1, wherein the proportion of the surfactant (B) is from 1 to 10 parts by mass per 100 parts by mass of the polymer (a).

13. The aqueous dispersion according to claim 1, wherein the polymer (a) further has a polymerized unit derived from a monomer (b) having no fluorine atom.

14. The aqueous dispersion according to claim 13, wherein the proportion of the polymerized unit derived from the monomer (b) in the polymer (a) is represented by a mass ratio of monomers such that the compound having repeating unit (A)/the monomer (b)=10/90 to 95/5.

15. The aqueous dispersion according to claim 13, wherein monomer (b) is a (meth)acrylate containing a saturated hydrocarbon group having at least 14 carbon atoms.

16. The aqueous dispersion according to claim 13, wherein the proportion of the polymerized unit derived from the monomer (b) in the polymer (a) is represented by a mass ratio of monomers such that the compound having repeating unit (A)/the monomer (b)=15/85 to 85/15.

17. The aqueous dispersion according to claim 1, wherein the polymer (a) further has a polymerized unit derived from a monomer (d) of the following formula 3:

$$(Z\text{-}Y)_n\text{-}G \qquad \text{Formula 3}$$

wherein n is 1 or 2, Z is a polyfluoroalkyl group, Y is a bivalent connecting group, and G is a monovalent or bivalent polymerizable group.

18. The aqueous dispersion according to claim 17, wherein the proportion of the polymerized unit derived from the monomer (d) in the polymer (a) is at most 40 mass %.

19. The aqueous dispersion according to claim 17, wherein Y is an alkylene group, a polyoxyalkylene group, an imino group, a group having an ester bond, an amide bond, an urethane bond or an ether linkage or a group represented by —R$^M$-Q-R$^N$—, wherein each of R$^M$ and R$^N$, which are independent of each other, is a single bond, or a saturated or unsaturated C$_{1\text{-}22}$ hydrocarbon group which may contain at least one hydrogen atom, and Q is a single bond, —OCONH—, —CONH—, —SO$_2$NH— or —NHCONH—.

20. The aqueous dispersion according to claim 17, wherein G is a residual group of a (meth)acrylate, a residual group of a maleic acid ester or a fumaric acid ester.

21. A method for producing an aqueous dispersion comprising a polymer (a) having a repeating unit (A) which comprises four carbon atoms connected in a linear chain and which has one double bond at the second position and a polyfluoroalkyl group bonded to an arbitrary carbon atom, which comprises subjecting a 1,3-diene having a polyfluoroalkyl group to an emulsion polymerization reaction in an aqueous medium in the presence of a surfactant (B) having a hydrophile-lipophile balance of at least 10, to form an aqueous dispersion.

22. The method for producing an aqueous dispersion according to claim 21, wherein the surfactant (B) is a nonionic surfactant and/or a cationic surfactant.

\* \* \* \* \*